(12) United States Patent
Kume et al.

(10) Patent No.: US 8,560,748 B2
(45) Date of Patent: Oct. 15, 2013

(54) INFORMATION PROCESSING SYSTEM INCLUDING INTERRUPT PROCESSING FUNCTION

(75) Inventors: Takayuki Kume, Yokohama (JP); Yousuke Nanri, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 273 days.

(21) Appl. No.: 13/070,154

(22) Filed: Mar. 23, 2011

(65) Prior Publication Data

US 2011/0320658 A1    Dec. 29, 2011

(30) Foreign Application Priority Data

Jun. 29, 2010  (JP) ................................. 2010-147249

(51) Int. Cl.
  *G06F 13/24*    (2006.01)
(52) U.S. Cl.
  USPC .......................................... 710/260; 710/110
(58) Field of Classification Search
  USPC ................................................ 710/110, 260
  See application file for complete search history.

(56) References Cited

U.S. PATENT DOCUMENTS

| 6,707,569 B1 * | 3/2004 | Kato et al. .................... 358/1.15 |
| 2004/0177183 A1 * | 9/2004 | Takahashi et al. ............ 710/100 |
| 2006/0090024 A1 * | 4/2006 | Tanabe .......................... 710/110 |
| 2011/0197004 A1 * | 8/2011 | Serebrin et al. ............... 710/267 |

FOREIGN PATENT DOCUMENTS

| JP | 8-2217270 A | 8/1996 |
| JP | 2004-252729 A | 9/2004 |

* cited by examiner

*Primary Examiner* — Glenn A Auve
(74) *Attorney, Agent, or Firm* — Arent Fox LLP

(57) ABSTRACT

An interrupt control circuit asserts a remap signal in response to an interrupt request from a low-speed slave to a processor, and reads information stored in an information register of the low-speed slave. The interrupt control circuit writes the read information into a buffer exclusively for interrupt processing. A switch circuit supplies a read access request which is a request from the processor to the information register to the low-speed slave during negation of the remap signal, and supplies the read access request to the buffer via the interrupt control circuit in order to read the information from the buffer during assertion of the remap signal. By accessing to the buffer exclusively for the interrupt processing instead of the information register in response to the read access request from the processor, the interrupt processing time may be shortened.

7 Claims, 13 Drawing Sheets

INFORMATION PROCESSING SYSTEM INCLUDING INTERRUPT PROCESSING FUNCTION

CROSS-REFERENCE TO RELATED APPLICATION

This application is based upon and claims the benefit of priority from Japanese Patent Application No. 2010-147249, filed on Jun. 29, 2010, the entire contents of which are incorporated herein by reference.

FIELD

The present embodiments relate to an information processing system including a processor that executes a program and performs interrupt processing in response to an interrupt request.

BACKGROUND

An information processing system is proposed which prefetches an interrupt service program to a prefetch buffer during a period when an interrupt request to a processor, such as a CPU, is generated until the processor starts to execute the interrupt service program. Moreover, in an information processing system wherein an interrupt processing regularly occurs, an approach to transfer data for use in the interrupt processing to a cache memory in advance is proposed. Related arts are discussed in Japanese Laid-open Patent Publication No. 08-221270 and No. 2004-252729.

The value in a register of an I/O device or the like for use in the interrupt processing varies also depending on factors other than the rewrite by the program. On the other hand, the data in the cache memory may be held over a long period until the data is driven out. For this reason, even if the data held in the register of the I/O device or the like is held in the cache memory, it may not guarantee that the value in the register and the value held in the cache memory are the same. That is, in the above-described interrupt service program, although the cache memory may be prefetched, the data held in the register of the I/O device or the like may not be prefetched to the cache memory. Therefore, in the interrupt service program, the register of the I/O device or the like may need to be directly accessed. Since the I/O device or the like is usually coupled to a low-speed slave port, the direct access to the register of the I/O device or the like degrades the execution efficiency of the interrupt service program and degrades the performance of the information processing system.

SUMMARY

According to an aspect of the embodiments an information processing system includes a processor coupled to a high-speed bus interface and executing a program; at least one of low-speed slaves being accessed via a low-speed bus interface, including an information register in which information indicative of an interrupt factor is stored, and issuing an interrupt request to the processor; an interrupt control circuit including a buffer exclusively for interrupt processing coupled to the high-speed bus interface, asserting a remap signal in response to the interrupt request to the processor, reading the information stored in the information register, and writing the information being read into the buffer; and a switch circuit supplying a read access request which being a request from the processor to the information register to one of the low-speed slaves during negation of the remap signal, and supplying the read access request to the buffer via the interrupt control circuit in order to read the information from the buffer during assertion of the remap signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
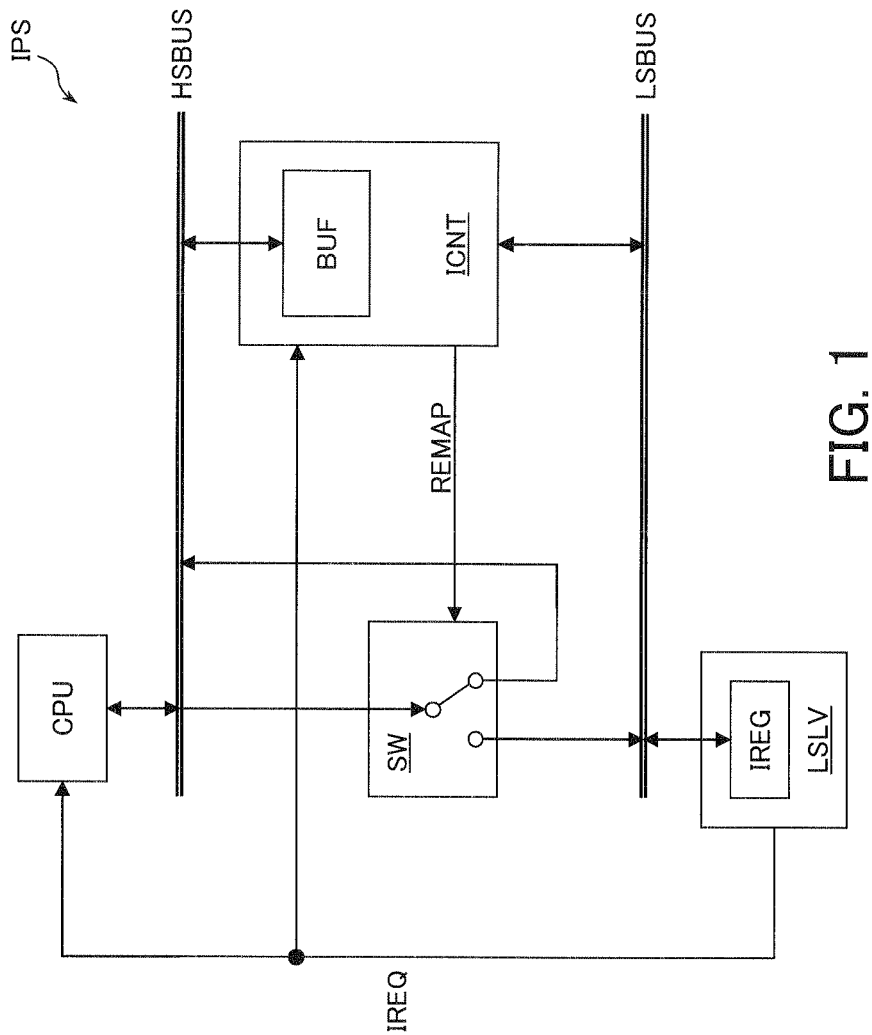
FIG. 1 illustrates an example of an information processing system in one embodiment.

Hereinafter, embodiments will be described with reference to the accompanying drawings. FIG. 1 illustrates an example of an information processing system IPS in one embodiment. The information processing system IPS includes a CPU (Central Processing Unit) coupled to a high-speed bus interface HSBUS, a low-speed slave LSLV coupled to a low-speed bus interface LSBUS, an interrupt control circuit ICNT, and a switch circuit SW. The CPU is one type of a processor executing a program. In response to an interrupt request IREQ from the low-speed slave LSLV, the CPU interrupts the execution of a normal program and executes an interrupt processing routine. The low-speed slave LSLV includes an information register IREG in which information, such as an interrupt factor, desired for the interrupt processing is stored, and has a function of issuing the interrupt request IREQ to the CPU.

The interrupt control circuit ICNT is connected to the high-speed bus interface HSBUS, and includes a buffer BUF exclusively for interrupt processing that may be accessed at a high speed. The interrupt control circuit ICNT, when the interrupt request IREQ is generated from the low-speed slave LSLV, operates to shorten a time until the CPU starts the interrupt processing routine.

For example, the interrupt control circuit ICNT asserts a remap signal REMAP in response to the interrupt request IREQ. Moreover, the interrupt control circuit ICNT reads information, such as an interrupt factor, from the information register IREG while the CPU is performing a process to shift to the interrupt processing routine used for the low-speed slave LSLV. That is, the interrupt control circuit ICNT pre-reads information, such as the interrupt factor, before the interrupt processing routine is started, and writes the read information into the buffer BUF.

The switch circuit SW supplies the read access request from the CPU to the buffer BUF via the interrupt control circuit ICNT during assertion of the remap signal REMAP. The switch circuit SW of FIG. 1 indicates a state where the remap signal REMAP is asserted. The switch circuit SW supplies the read access request from the CPU to the low-speed slave LSLV during negation of the remap signal REMAP.

Thus, in the interrupt processing routine that is executed by the CPU in response to the interrupt request IREQ, information, such as the interrupt factor, held in the information register IREG may be read at a high speed by the CPU. Because the interrupt factor may be determined promptly, the time from when the interrupt request IREQ is generated until the interrupt processing routine is started may be shortened.

Note that information, such as the interrupt factor, is written into the buffer BUF in response to the interrupt request IREQ. The information, such as the interrupt factor, held in the information register IREG will never be rewritten immediately after the interrupt request IREQ. For this reason, at the time of reading the information, such as the interrupt factor, by the interrupt processing routine, the value held in the buffer BUF will never differ from the value held in the information register IREG.

As described above, in this embodiment, the information being stored in the information register IREG of the low-speed slave LSLV is stored into the interrupt processing dedicated buffer BUF and this information is read from the buffer BUF in response to the read access request from the CPU, so that the interrupt processing time may be shortened without degrading the performance of the information processing system IPS.

Figure 2:
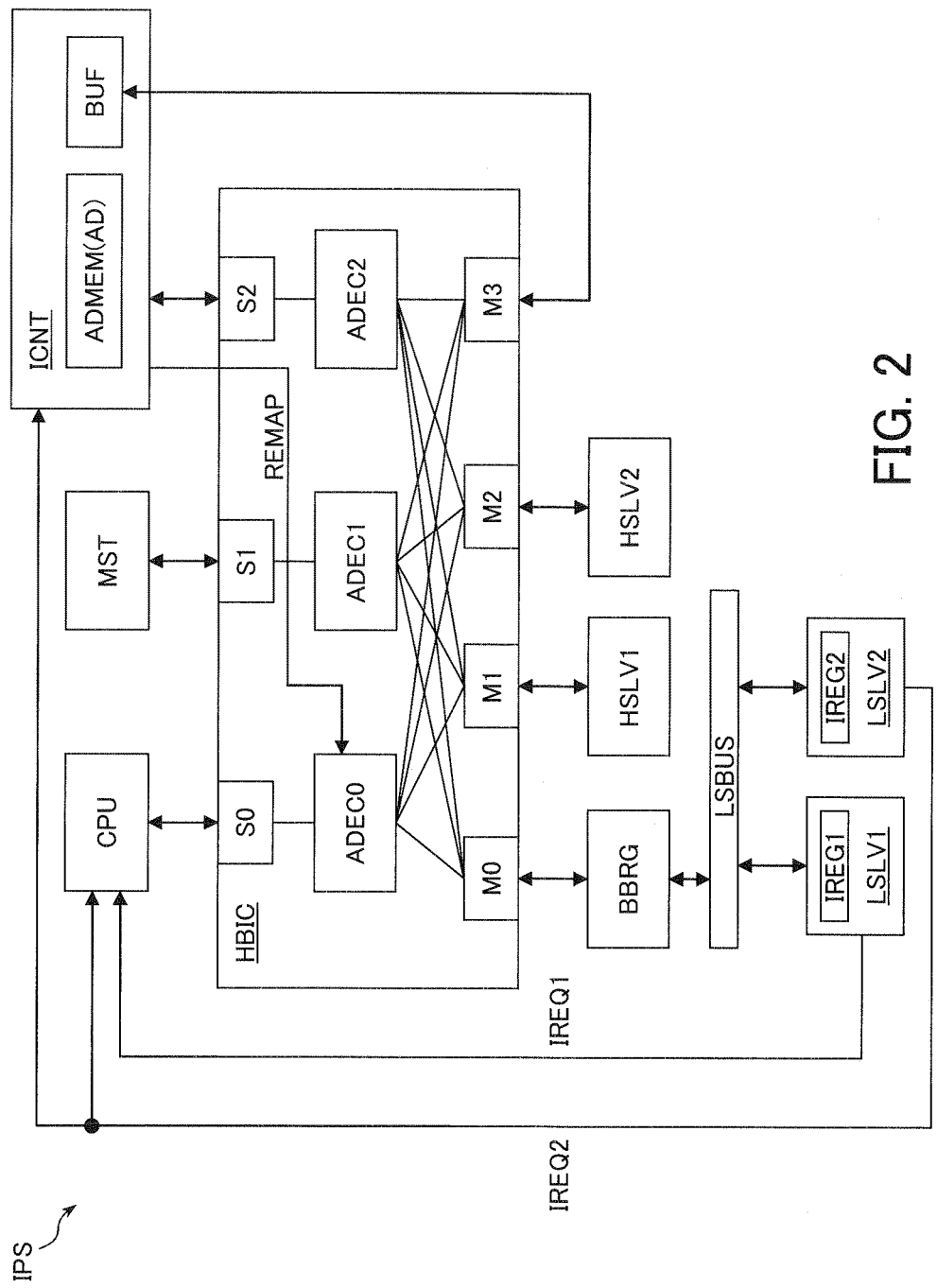
FIG. 2 illustrates an example of the information processing system in another embodiment.

FIG. 2 illustrates an example of the information processing system IPS in another embodiment. For the same elements as the elements in the embodiment described above, the same reference numerals are given, and the detailed description thereof is omitted. For example, the information processing system IPS is formed in one chip as a semiconductor integrated circuit.

The information processing system IPS includes a CPU coupled via a high-speed interconnect HBIC that is one type of the high-speed bus interface, a master MST, an interrupt control circuit ICNT, a bus bridge BBRG, high-speed slaves HSLV1, HSLV2, and low-speed slaves LSLV1, LSLV2 coupled to the bus bridge BBRG via the low-speed bus interface LSBUS. The low-speed slaves LSLV1, LSLV2 include information registers IREG1, IREG2, in which the information, such as the interrupt factor, is stored, respectively.

The CPU controls the whole operation of the information processing system IPS by executing a program. For example, the CPU includes a cache memory in which the program is temporarily stored. Moreover, the CPU has an interrupt controller receiving the interrupt requests IREQ1, IREQ2. Note that the interrupt controller may be formed outside the CPU.

For example, the master MST is a DMAC (Direct Memory Access Controller). The CPU, master MST, and interrupt control circuit ICNT are master devices capable of issuing transaction to the high-speed interconnect HBIC. The high-speed slaves HSLV1, HSLV2 are memory controllers used for a high-speed SRAM or DRAM, for example. The low-speed slaves LSLV1, LSLV2 are peripheral devices, such as a timer or a communication interface, and issue the interrupt requests IREQ1, IREQ2, respectively. The bus bridge BBRG performs conversion from a high-speed bus protocol on the high-speed interconnect HBIC side to a low-speed bus protocol on the low-speed bus interface LSBUS side, or vice versa.

Figure 3:
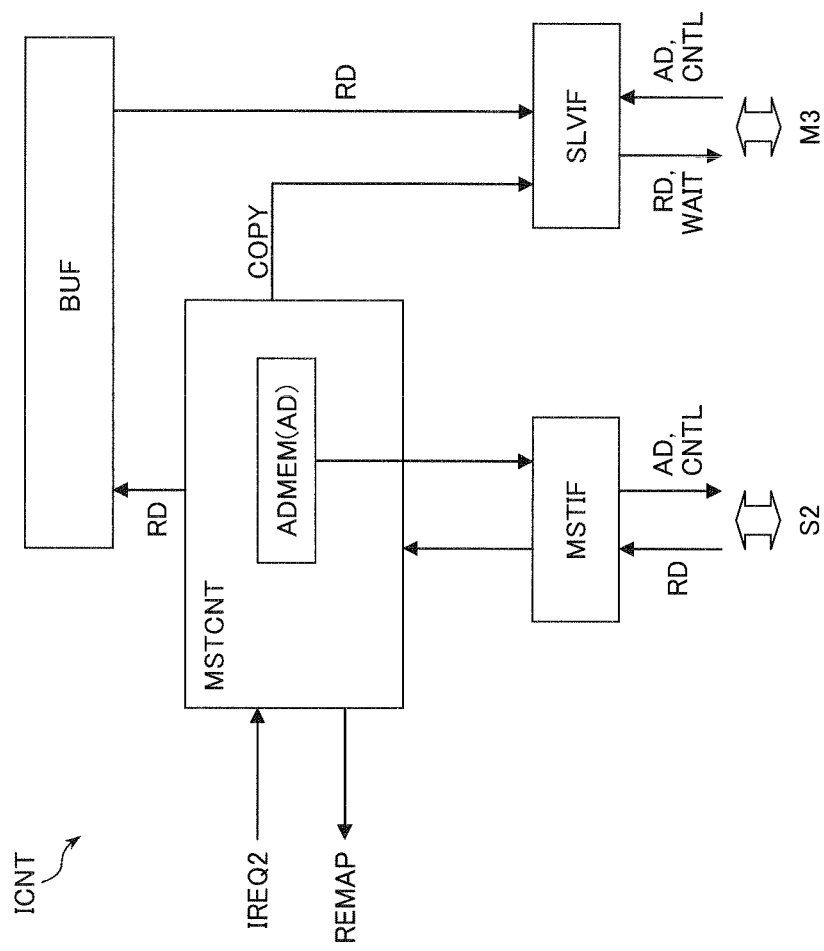
FIG. 3 illustrates an example of an interrupt control circuit illustrated in FIG. 2.

The interrupt control circuit ICNT is accessed at a high speed, as in FIG. 1, and includes the buffer BUF exclusively for interrupt processing in which the information, such as the interrupt factor, is stored. Moreover, the interrupt control circuit ICNT includes an address memory unit ADMEM for storing an address AD indicative of the information register IREG2 of the low-speed slave LSLV2. As in FIG. 1, the interrupt control circuit ICNT, when the interrupt request IREQ2 is generated from the low-speed slave LSLV2, operates to shorten a time until the CPU starts the interrupt processing routine. An example of the interrupt control circuit ICNT is illustrated in FIG. 3.

For example, the low-speed slave LSLV1 is a device that may be used even if the time from when the interrupt request IREQ1 is generated until the interrupt processing is started is long. In contrast, the low-speed slave LSLV2 is a device wherein the time from when the interrupt request IREQ2 is generated until the interrupt processing is started is desired to be a certain time or less. In order to normally operate the information processing system IPS, the interrupt processing of the low-speed slave LSLV2 needs to be started promptly. For this reason, the function of an address decoder ADEC0 is switched by the remap signal REMAP which the interrupt control circuit ICNT generates, and in place of the low-speed slave LSLV2 the buffer BUF is accessed.

The high-speed interconnect HBIC includes slave ports S0, S1, S2, address decoders ADEC0-ADEC2, and master ports M0-3. The slave ports S0, S1, S2 are coupled to the CPU, the master MST, and the interrupt control circuit ICNT, respectively. The master ports M0, M1, M2, M3 are coupled to the bus bridge BBRG, the high-speed slaves HSLV1, HSLV2, and the interrupt control circuit ICNT, respectively.

Figure 4:
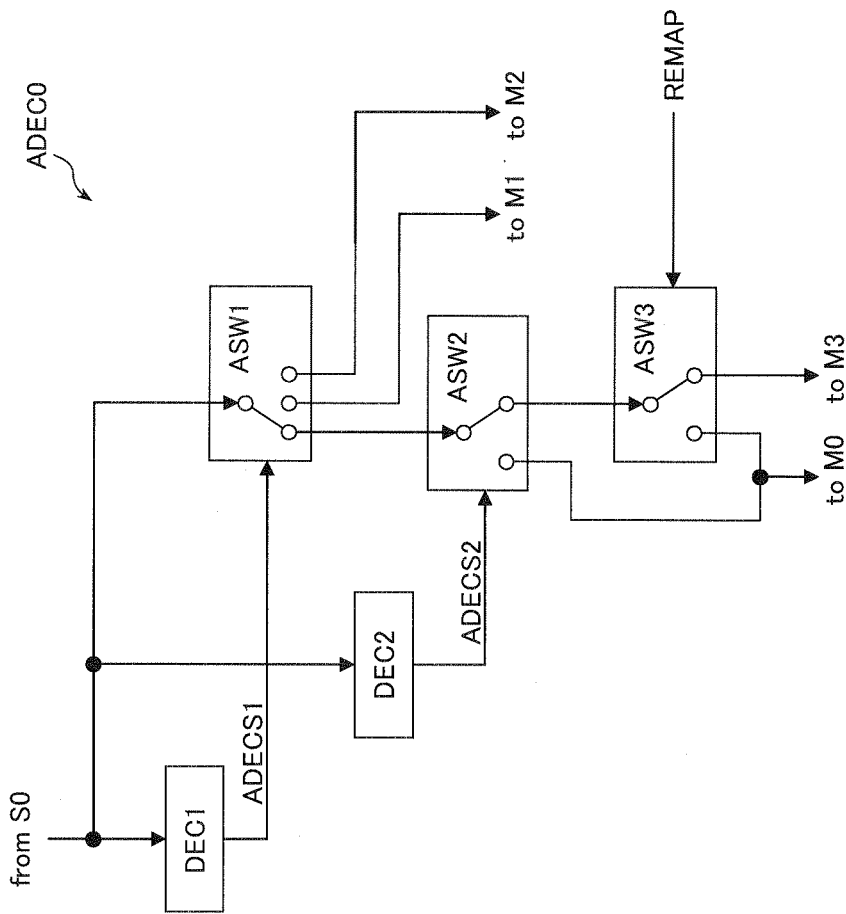
FIG. 4 illustrates an example of an address decoder illustrated in FIG. 2.

The address decoder ADEC0 decodes an address from the CPU, and outputs the address to either of the master ports M0-3 according to the decoded result. The address decoder ADEC1 decodes an address from the master MST, and outputs the address to either of the master ports M0-3 according to the decoded result. The address decoder ADEC2 decodes an address from the interrupt control circuit ICNT, and outputs the address to either of the master ports M0-3 according to the decoded result. An example of the address decoder ADEC0 is illustrated in FIG. 4.

Note that in the high-speed interconnect HBIC illustrated in FIG. 2, although the transmission path of the address is mainly illustrated, a control signal and data are also transmitted. For this reason, each address decoder ADEC0-2 may have a function of switching the transmission paths of the control signal and data. Similarly, the low-speed bus interface LSBUS transmits not only the address but the control signal and data. The high-speed interconnect HBIC and low-speed bus interface LSBUS are bi-directional buses.

FIG. 3 illustrates an example of the interrupt control circuit ICNT illustrated in FIG. 2. The interrupt control circuit ICNT includes the buffer BUF, a master control circuit MSTCNT with the address memory unit ADMEM, a master interface MSTIF, and a slave interface SLVIF.

The address memory unit ADMEM stores an address AD indicative of the information register IREG2 of the low-speed slave LSLV2. For example, the information register IREG2 stores information indicative of a factor causing the interrupt request IREQ2. Note that the master control circuit MSTCNT may include two or more address memory units ADMEM.

The value of the address AD stored in the address memory unit ADMEM is set as a photomask pattern of a metal wiring layer used in manufacturing a semiconductor integrated circuit. Alternatively, the value of the address AD is set using a fuse circuit formed above a semiconductor integrated circuit. For this reason, the value of the address AD is a fixed value, and may not be changed after the semiconductor integrated circuit is shipped.

The master control circuit MSTCNT monitors the interrupt request IREQ2, and in response to the interrupt request IREQ2, outputs the address AD stored in the address memory unit ADMEM to the master interface MSTIF together with a control signal CNTL for performing read-access on the low-speed slave LSLV2.

The master interface MSTIF outputs the address AD and control signal CNTL from the master control circuit MSTCNT to the slave port S2 of the high-speed interconnect HBIC illustrated in FIG. 2. That is, the master interface MSTIF has a function of issuing bus transaction in order to read information from the information register IREG2.

The bus transaction supplied to the slave port S2 is transmitted to the low-speed slave LSLV2 via the address decoder ADEC2, master port M0, bus bridge BBRG, and low-speed bus interface LSBUS of FIG. 2. The low-speed slave LSLV2 outputs the information including the interrupt factor stored in the information register IREG2 to the low-speed bus interface LSBUS according to the bus transaction. The information output to the low-speed bus interface LSBUS is transmitted to the master interface MSTIF via the bus bridge BBRG, master port M0, and slave port S2.

The master interface MSTIF receives the value in the information register IREG2, which is read from the low-speed slave LSLV2, as read data RD and outputs the value to the master control circuit MSTCNT. The master control circuit MSTCNT writes the read data RD into the buffer BUF. The master control circuit MSTCNT, during the time from receipt of the interrupt request IREQ2 until the read data is written into the buffer BUF, asserts a copying signal COPY to the slave interface SLVIF in order to prevent the empty buffer BUF from being accessed by the CPU.

The buffer BUF may be accessed by the CPU at a high speed as compared with the low-speed slave LSLV2. The size of the buffer BUF is designed in accordance with the size of the information register IREG2 from which information is read. For example, when information including the interrupt factor is read from the 32-bit wide information register IREG2, the buffer BUF is designed with a size capable of storing 32-bit wide data RD.

Note that when the information desired for the interrupt service program that is executed in response to the interrupt request IREQ2 is stored in a plurality of information registers IREG2 of the low-speed slave LSLV2, the master control circuit MSTCNT includes a plurality of address memory units ADMEM. The plurality of address memory units ADMEM respectively store a plurality of addresses AD each indicative of a plurality of information registers IREG2 of the low-speed slave LSLV2. Then, the master control circuit MSTCNT sequentially outputs the plurality of addresses AD together with the control signal CNTL to the master interface MSTIF in order to read information from the plurality of information registers IREG2.

Furthermore, the master control circuit MSTCNT asserts the remap signal REMAP in response to the interrupt request IREQ2, and outputs the remap signal REMAP to the address decoder ADEC0 illustrated in FIG. 2. Upon receipt of the read access request including an address indicative of the information register IREG2 from the CPU due to the assertion of the remap signal REMAP, the address decoder ADEC0 outputs the address AD and control signal CNTL to the master port M3, not to the master port M0. In this manner, the address AD and control signal CNTL, which are output from the CPU in order to perform read-access on the information register IREG2, are transmitted to the interrupt control circuit ICNT via the master port M3 during assertion of the remap signal REMAP.

The slave interface SLVIF of the interrupt control circuit ICNT reads the data RD held in the buffer BUF in response to the address AD and control signal CNTL, which are supplied from the CPU via the master port M3, and outputs the data to the master port M3. The data RD output to the master port M3 is transmitted to the CPU via the slave port S0. Then, the CPU reads the information held in the buffer BUF as the information which is held in the information register IREG2 of the low-speed slave LSLV2. Note that when the copying signal COPY is being asserted, the slave interface SLVIF asserts a wait request WAIT to the master port M3. Thus, until the copying signal COPY is negated, a wait cycle is inserted in the access cycle of the information register IREG2 (actually, the access cycle of the buffer BUF) which is performed by the CPU. That is, when the read access request is issued before the information stored in the information register IREG2 is written into the buffer BUF in response to the interrupt request IREQ2, the wait request WAIT is issued to the CPU.

FIG. 4 illustrates an example of the address decoder ADEC0 illustrated in FIG. 2. The address decoder ADEC0 includes decoders DEC1, DEC2 and switches ASW1, ASW2, ASW3. For example, the decoder DEC1 decodes a high-order bit group of an address which is transmitted from the CPU via the slave port S0, and outputs the resulting address decoded signal ADECS1 to the switch ASW1.

The switch ASW1 supplies a low-order bit group of the address, which is transmitted from the CPU via the slave port S0, to either of the switch ASW2, master ports M1, M2 according to the address decoded signal ADECS1. For example, when the high-order bit group of the address indicates the master port M0, the low-order bit group of the address is supplied to the switch ASW2. When the high-order bit group of the address indicates the master port M1, the low-order bit group of the address is supplied to the master port M1. When the high-order bit group of the address indicates the master port M2, the low-order bit group of the address is supplied to the master port M2.

For example, the decoder DEC2 decodes a middle-order bit group of the address, which is transmitted from the CPU via the slave port S0, and outputs the resulting address decoded signal ADECS2 to the switch ASW2. The switch ASW2 supplies the low-order bit group of the address from the switch ASW1 to the switch ASW3 or master port M0 according to the address decoded signal ADECS2.

For example, when the middle-order bit group of the address indicates the information register IREG2, the low-order bit group of the address is supplied to the switch ASW3. When the middle-order bit group of the address indicates the low-speed slave LSLV1 and one except for the information register IREG2 of the low-speed slave LSLV2, the low-order bit group of the address is supplied to the master port M0.

The switch ASW3 supplies the low-order bit group of the address from the switch ASW2 to the master port M0 or M3 according to the remap signal REMAP. For example, during negation of the remap signal REMAP, the low-order bit group of the address is supplied to the master port M0. During assertion of the remap signal REMAP, the low-order bit group of the address is supplied to the master port M3. Meanwhile, when a write-access is requested during assertion of the remap signal REMAP, the low-order bit group of the address is supplied to the master port M0.

In this manner, the address decoder ADEC0 operates as a switch circuit which, during assertion of the remap signal REMAP, supplies the read access request to the buffer BUF via the interrupt control circuit ICNT in order to read the information from the buffer BUF, and which, during negation of the remap signal REMAP, supplies to the low-speed slave LSLV2 the read access request from the CPU to the information register IREG2. Note that the switches ASW1-ASW3 may switch not only the address but the control signal and data transmission destination that are supplied together with the address from the CPU.

Figure 5:
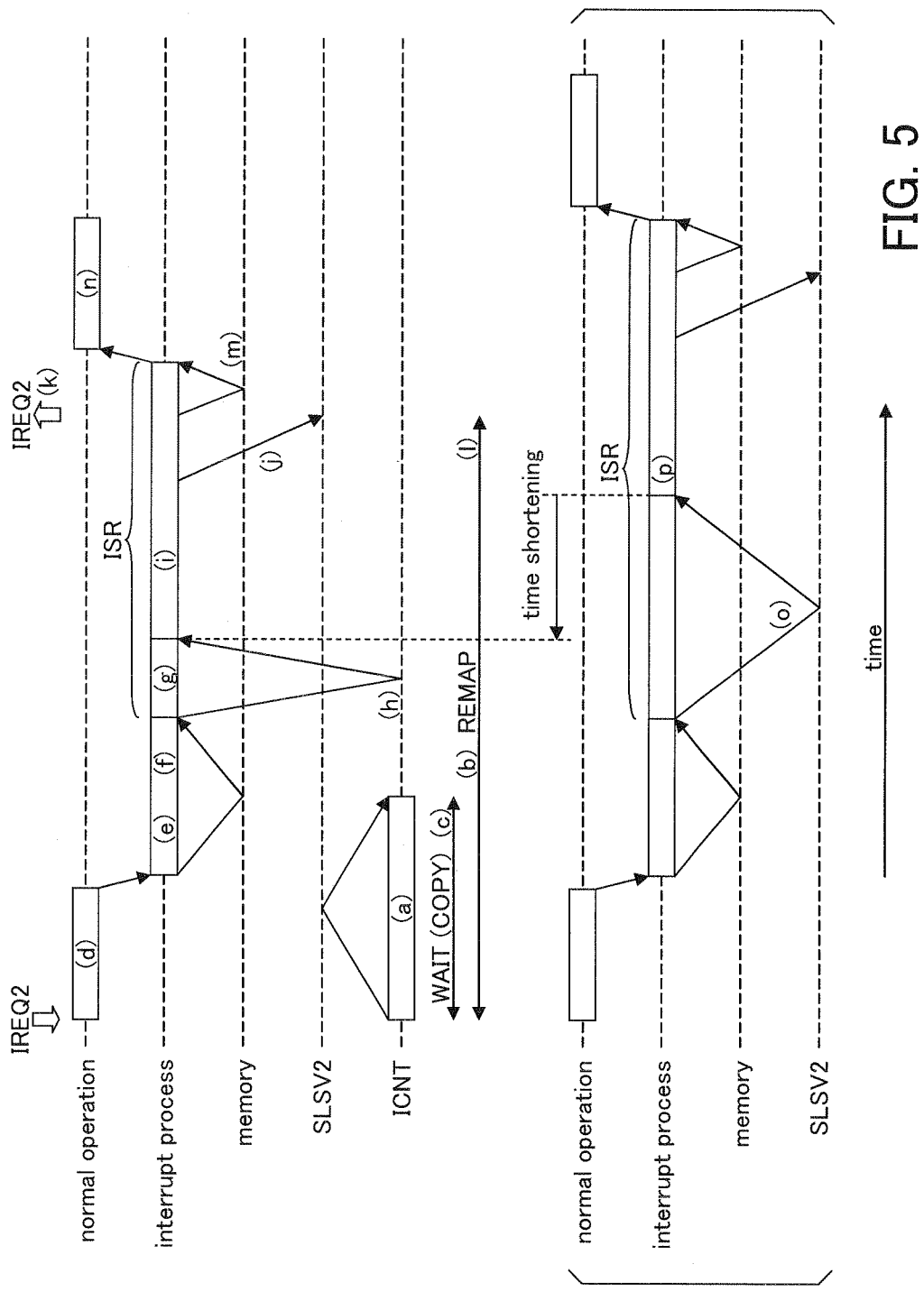
FIG. 5 illustrates an example of interrupt processing of a CPU illustrated in FIG. 2.

FIG. 5 illustrates an example of the interrupt processing of the CPU illustrated in FIG. 2. In this example, while the CPU executes a normal program in order to execute a normal operation, the interrupt request IREQ2 is generated from the low-speed slave LSLV2. The CPU interrupts the execution of the normal program and executes the interrupt service program.

In response to assertion of the interrupt request IREQ2, the interrupt control circuit ICNT illustrated in FIG. 2 performs read-access on the information register IREG2, and writes the information held in the information register IREG2 into the buffer BUF ((a) in FIG. 5). That is, pre-read of an interrupt factor of the low-speed slave LSLV2 that issued the interrupt request IREQ2 is performed. Moreover, the interrupt control circuit ICNT asserts the remap signal REMAP in response to the interrupt request IREQ2 ((b) in FIG. 5). Furthermore, the interrupt control circuit ICNT asserts the wait request WAIT until it writes the information read from the information register IREG2 into the buffer BUF ((c) in FIG. 5).

The CPU interrupts a currently executed instruction within one cycle to 16 cycles, for example ((d) in FIG. 5). The CPU accesses a memory in order to fetch an instruction of an interrupt processing routine ISR (Interrupt Service Routine) ((e) in FIG. 5). Here, the memory to be fetched is a cache memory, a main memory, or the like in which the interrupt processing routine ISR is stored. If a cache miss occurred, a cache line fill is executed which copies the interrupt processing routine ISR from a main memory to a cache memory.

Next, the CPU retreats the value of a register in the CPU to a stack memory or the like in order to hold a state of the normal operation that has been executed ((f) in FIG. 5). Reference numerals (e), (f) in FIG. 5 represent a process to shift to the interrupt processing routine used for the low-speed slave LSLV2. Subsequently, the CPU starts the execution of the interrupt processing routine ISR, and performs read-access on the information register IREG2 in order to examine the factor causing the interrupt request IREQ2 ((g) in FIG. 5). When the CPU starts the execution of the interrupt processing routine ISR, the interrupt control circuit ICNT has already written the information held in the information register IREG2 into the buffer BUF. For this reason, as described in FIG. 3 and FIG. 4, the buffer BUF of the interrupt control circuit ICNT is accessed ((h) in FIG. 5), in place of the information register IREG2 being accessed. Thus, the CPU may read the information of the information register IREG2 at a high speed.

Subsequently, based on the read value of the information register IREG2, the CPU analyzes the factor causing the interrupt request IREQ2, and executes the interrupt processing corresponding to the interrupt factor ((i) in FIG. 5). After the execution of the interrupt processing, in order to negate the interrupt request IREQ2 the CPU performs write-access on the information register IREG2 and resets the information register IREG2 ((j) in FIG. 5). Note that because the reset of the information register IREG2 is the write-access, the address decoder ADEC0 outputs the address and control signal to the master port M0 regardless of the level of the remap signal REMAP.

In response to the reset of the information register IREG2, the interrupt request IREQ2 is negated ((k) in FIG. 5). The interrupt control circuit ICNT negates the remap signal REMAP in response to the negation of the interrupt request IREQ2 ((l) in FIG. 5). Next, the CPU returns the information retreated in the stack memory or the like to the register in the CPU ((m) in FIG. 5). Then, the CPU starts to fetch an instruction in order to execute the normal operation, which had been interrupted, again ((n) in FIG. 5).

The lower part of FIG. 5 illustrates an example when the CPU performs the read-access directly on the information register IREG2 in order to examine the factor causing the interrupt request IREQ2. That is, the lower part of FIG. 5 illustrates an example of the operation when the information processing system IPS does not include the interrupt control circuit ICNT illustrated in FIG. 2.

When the information register IREG2 is directly accessed, the read cycle time increases as compared with when the buffer BUF is accessed ((o) in FIG. 5). Thus, the execution start timing of the interrupt processing routine ISR by the CPU is delayed ((p) in FIG. 5). In other words, due to the operation of the interrupt control circuit ICNT, in the interrupt processing routine ISR, the time until the interrupt processing is started may be shortened and the performance of the information processing system IPS may be improved.

Figure 6:
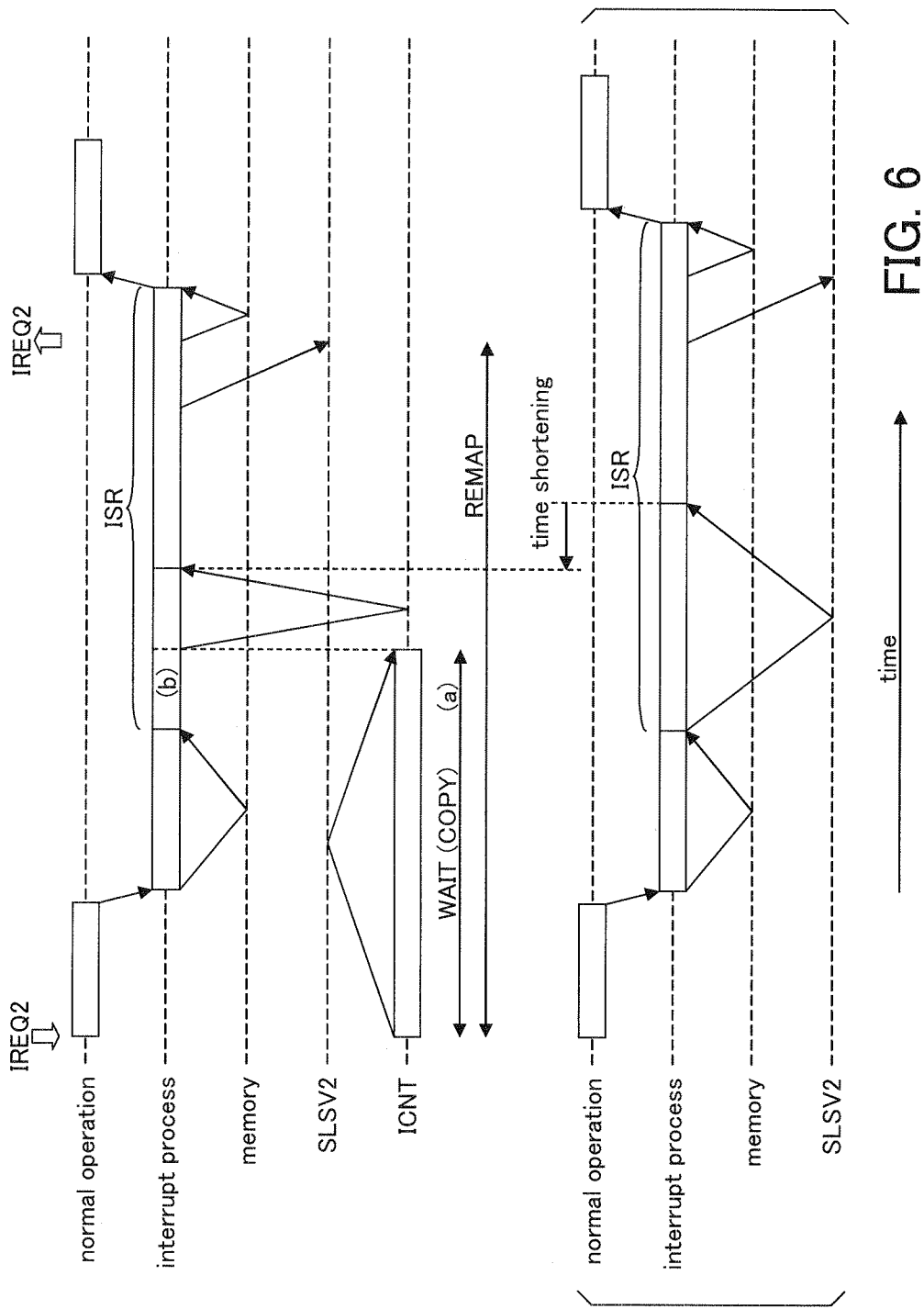
FIG. 6 illustrates another example of the interrupt processing of the CPU illustrated in FIG. 2.

FIG. 6 illustrates another example of the interrupt processing of the CPU illustrated in FIG. 2. For the same operation as that of FIG. 5, the detailed description is omitted. FIG. 6 illustrates an example wherein it takes time for the interrupt control circuit ICNT to perform the read-access of the information register IREG2. For example, at the time of occurrence of the interrupt request IREQ2, when the low-speed bus interface LSBUS illustrated in FIG. 2 is being used for access to the low-speed slave LSLV1 or the like, the access to the low-speed slave LSLV2 is kept waiting.

The interrupt control circuit ICNT continues to assert the wait request WAIT until the writing of the information read from the information register IREG2 into the buffer BUF is completed ((a) in FIG. 6). For this reason, during assertion of the wait request WAIT, the read-access to the information register IREG2 by the interrupt processing routine ISR is kept waiting ((b) in FIG. 6). Thus, the execution time of the interrupt processing routine ISR increases as compared with that of FIG. 5. However, because the factor causing the wait request WAIT to be asserted occurs at a certain probability, the wait cycle may occur also in access to the low-speed slave LSLV2 by the CPU. For this reason, the content of the information register IREG2 is copied, in advance, to the buffer BUF exhibiting a high access speed before the interrupt processing routine ISR is started, so that the processing time of the interrupt processing routine ISR may be shortened.

As described above, also in this embodiment, the same effect as that of the above-described embodiment may be obtained. Furthermore, the wait request WAIT continues to be asserted until the information of the information register IREG2 is written into the buffer BUF, so that it is possible to prevent the CPU from accessing the empty buffer BUF and prevent the malfunction of the information processing system IPS. The master interface MSTIF and slave interface SLVIF are formed in the interrupt control circuit ICNT, so that the issuing of the bus transaction to the low-speed bus interface and the reception of the bus transaction from the high-speed bus interface may be performed easily.

Figure 7:
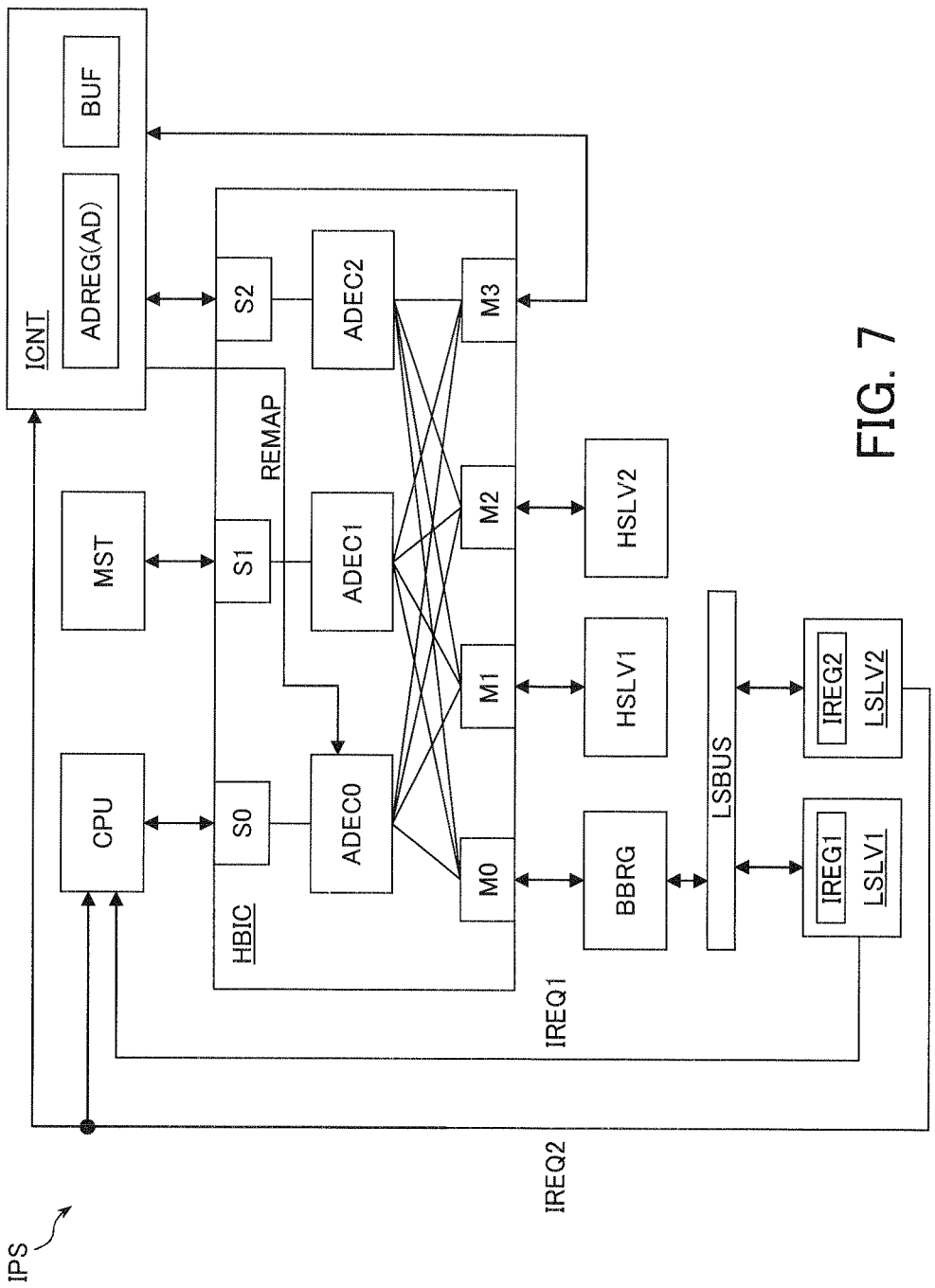
FIG. 7 illustrates an example of the information processing system in another embodiment.

FIG. 7 illustrates an example of the information processing system IPS in another embodiment. For the same elements as the elements in the embodiments described above, the same reference numerals are given, and the detailed description thereof is omitted. For example, the information processing system IPS is formed in one chip as a semiconductor integrated circuit. In this embodiment, the interrupt control circuit ICNT and address decoder ADEC0 differ from those of FIG. 2. The other configuration of the information processing system IPS is the same as that of FIG. 2. The CPU includes an interrupt controller receiving the interrupt requests IREQ1, IREQ2. Note that the interrupt controller may be formed outside the CPU.

Figure 8:
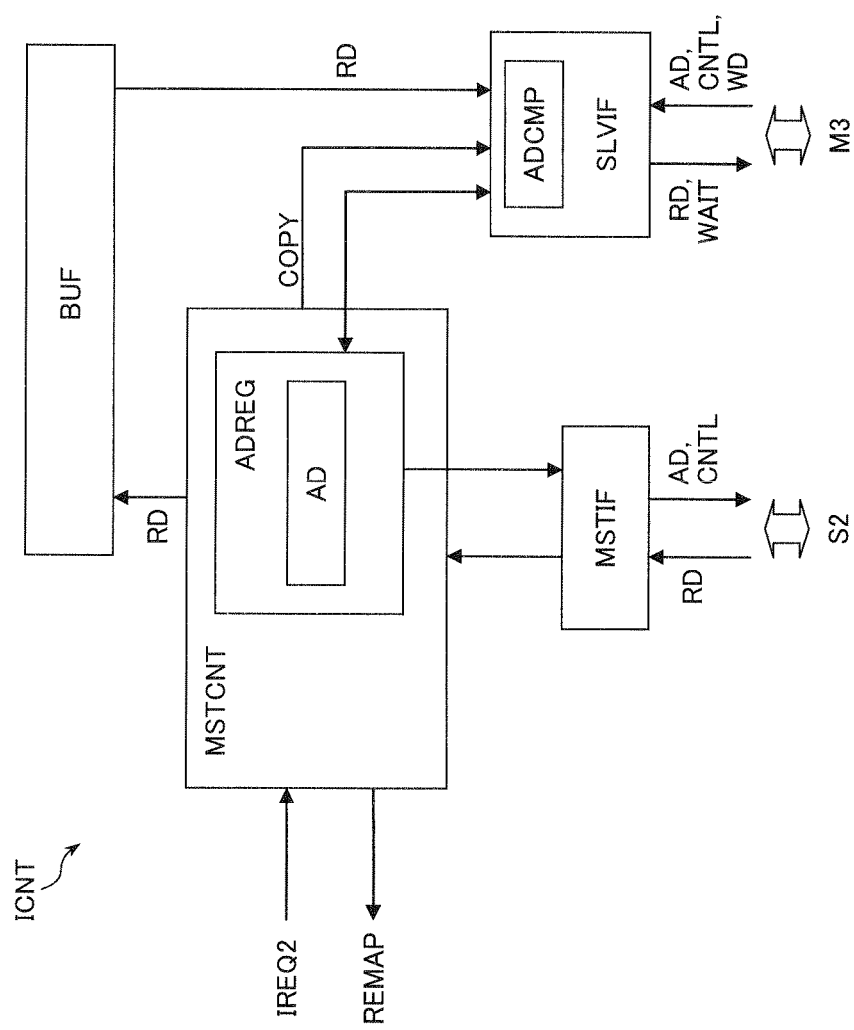
FIG. 8 illustrates an example of the interrupt control circuit illustrated in FIG. 7.

FIG. 8 illustrates an example of the interrupt control circuit ICNT illustrated in FIG. 7. In the interrupt control circuit ICNT, the master control circuit MSTCNT and slave interface SLVIF differ from those of FIG. 3. The other configuration of the interrupt control circuit ICNT is the same as that of FIG. 3.

The master control circuit MSTCNT includes an address register ADREG in place of the address memory unit ADMEM illustrated in FIG. 3. The address register ADREG holds the address AD indicative of the information register IREG2 of the low-speed slave LSLV2. In the information register IREG2, the information indicative of a factor causing the interrupt request IREQ2 is stored, as with the above-described embodiment. However, the number of addresses indicative of the information register IREG2 is not one. In other words, the address indicative of the information register IREG2 differs depending on the information processing system IPS to be designed. Alternatively, the interrupt factor is stored in one of a plurality of information registers IREG2 according to the operation mode.

The address register ADREG may be read/written by the CPU via the slave port S0, master port M3, and slave interface SLVIF illustrated in FIG. 7. For example, the address register ADREG is set before the interrupt function is enabled, such as during system boot. The address register ADREG is made rewritable, so that the address of the information register IREG2, in which the information indicative of a factor causing the interrupt request IREQ2 is stored, may be arbitrarily set according to the system specification. Alternatively, when the factor causing the interrupt request IREQ2 differs depending on the operation mode and the information register IREG2 to be referred to differs, the CPU rewrites the address AD of the address register ADREG for each operation mode. Thus, the circuit size of the master control circuit MSTCNT may be minimized. Note that the number of address registers ADREG may be two or more.

In the slave interface SLVIF in this example, an address comparator ADCMP and a function of accessing the address register ADREG are added to the slave interface SLVIF illustrated in FIG. 3. The address comparator ADCMP compares the address AD included in the read access request, which is supplied from the CPU via the slave port S0 and master port M3 illustrated in FIG. 7, with the address AD held in the address register ADREG.

The slave interface SLVIF, when the address AD from the CPU coincides with the address AD held in the address register ADREG, reads the data RD from the buffer BUF and outputs the data to the CPU. The slave interface SLVIF, when the address AD from the CPU differs from the address AD held in the address register ADREG, supplies the read access request (the address AD and control signal CNTL) from the CPU to the low-speed slave LSLV2 via the master interface MSTIF.

For example, the read access request from the CPU is supplied to the low-speed slave LSLV2 via the master interface MSTIF, slave port S2, master port M0, bus bridge BBRG, and low-speed bus interface LSBUS. Moreover, the data RD read from the low-speed slave LSLV2 is transmitted to the slave interface SLVIF via the low-speed bus interface LSBUS, bus bridge BBRG, master port M0, slave port S2, master interface MSTIF, and master control circuit MSTCNT. Furthermore, the read data RD is transmitted to the CPU via the master port M3 and slave port S0 from the slave interface SLVIF. Thus, also when the address AD held in the address register ADREG is rewritten, the data RD may be reliably read from the buffer BUF according to the address AD held in the address register ADREG.

Figure 9:
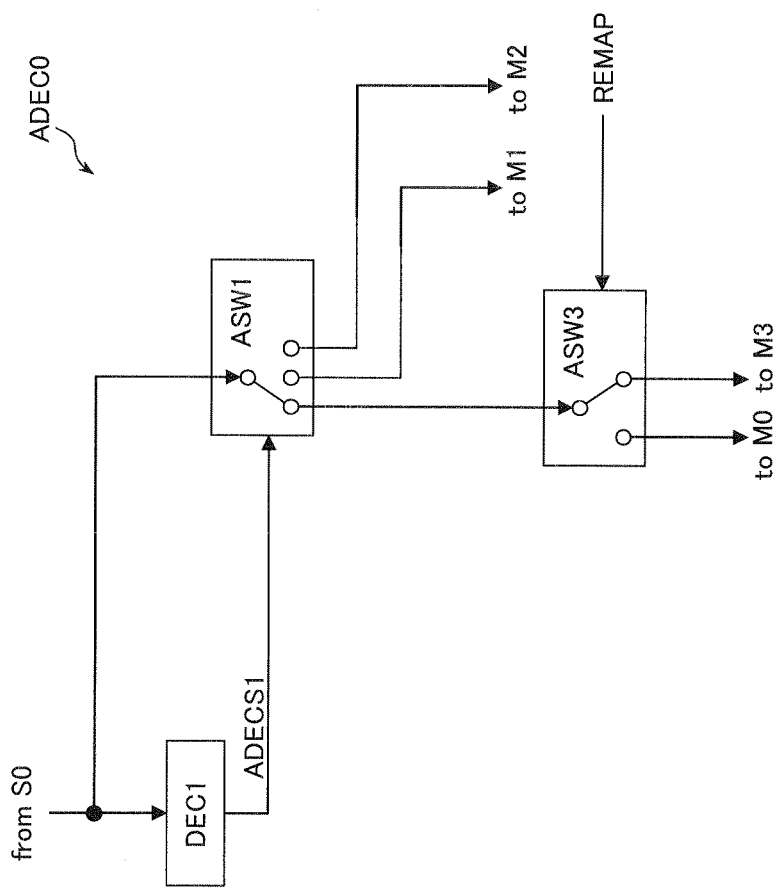
FIG. 9 illustrates an example of an address decoder illustrated in FIG. 7.

FIG. 9 illustrates an example of the address decoder ADEC0 illustrated in FIG. 7. In the address decoder ADEC0 in this example, the decoder DEC2 and switch ASW2 are eliminated from the address decoder ADEC0 illustrated in FIG. 4. The other configuration of the address decoder ADEC0 is the same as that of FIG. 4. The switch ASW3, during assertion of the remap signal REMAP, supplies the low-order bit group of the address from the switch ASW1 to the master port M3, while during negation of the remap signal REMAP, the switch ASW3 supplies the low-order bit group of the address from the switch ASW1 to the master port M0. Thus, after assertion of the interrupt request IREQ2, only when the address AD from the CPU coincides with the address AD held in the address register ADREG, the value of the information register IREG2 held in the buffer BUFF may be read at a high speed.

As described above, also in this embodiment, the same effect as that of the above-described embodiments may be obtained. Note that in this embodiment, in access to the low-speed slave LSLV2, access latency increases when the low-speed slave LSLV2 is accessed via the interrupt control circuit ICNT. However, the content of the information register IREG2 is copied to the buffer BUF in advance, so that as with FIG. 5 and FIG. 6, the processing time of the interrupt processing routine ISR may be shortened.

Figure 10:
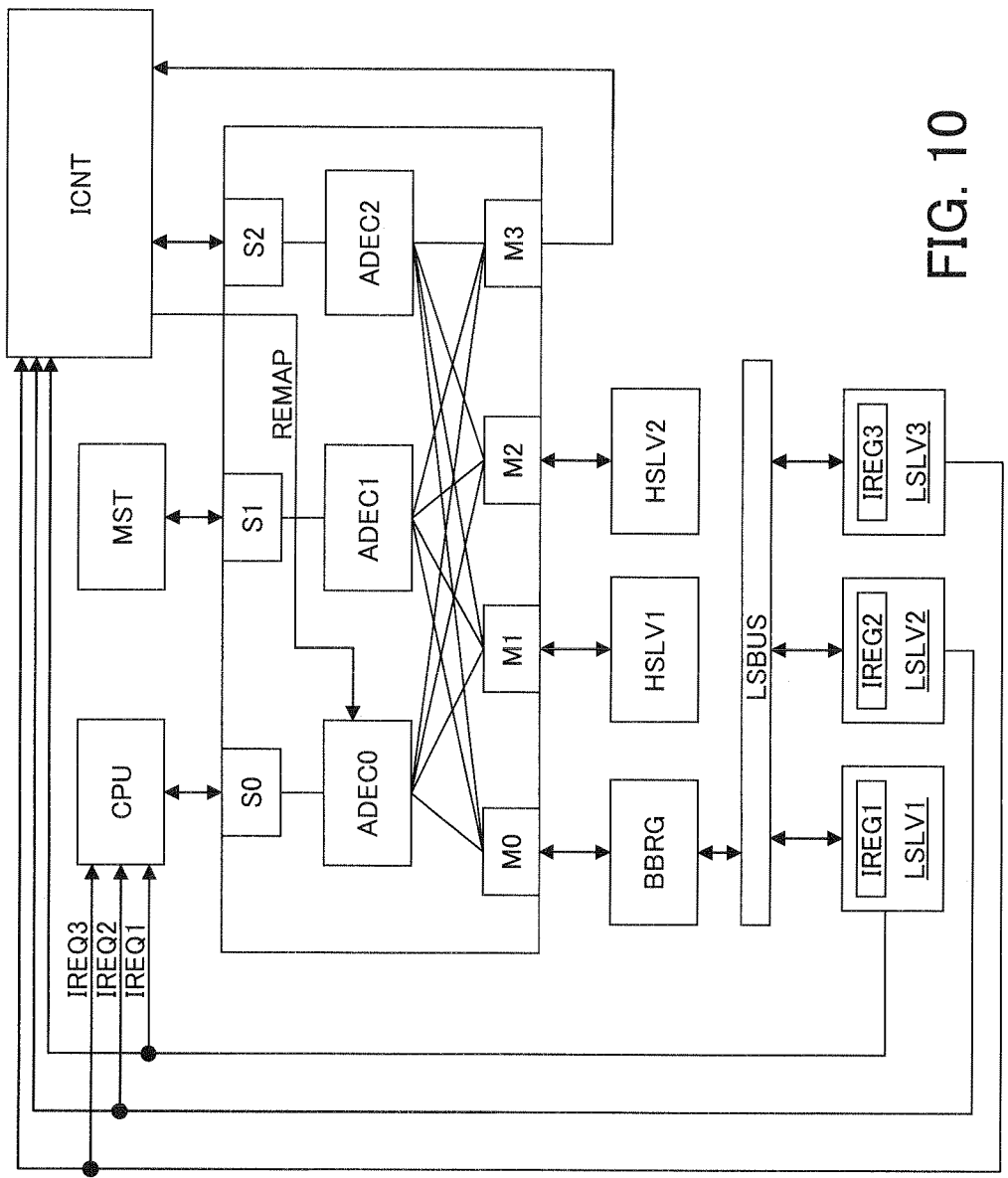
FIG. 10 illustrates an example of the information processing system in another embodiment.

FIG. 10 illustrates an example of the information processing system IPS in another embodiment. For the same elements as the elements in the embodiments described above, the same reference numerals are given, and the detailed description thereof is omitted. For example, the information processing system IPS is formed in one chip as a semiconductor integrated circuit. In this embodiment, the information processing system IPS includes three low-speed slaves LSLV1, LSLV2, LSLV3. The interrupt requests IREQ1-3 output from the low-speed slave LSLV1-3 are supplied to the CPU and interrupt control circuit ICNT. The CPU includes an interrupt controller receiving the interrupt request IREQ1-3. Note that the interrupt controller may be formed outside the CPU. The other configuration of the information processing system IPS is the same as that of FIG. 2 except that the address decoder ADEC0 operates upon receipt of the remap signal REMAP1-3.

Figure 11:
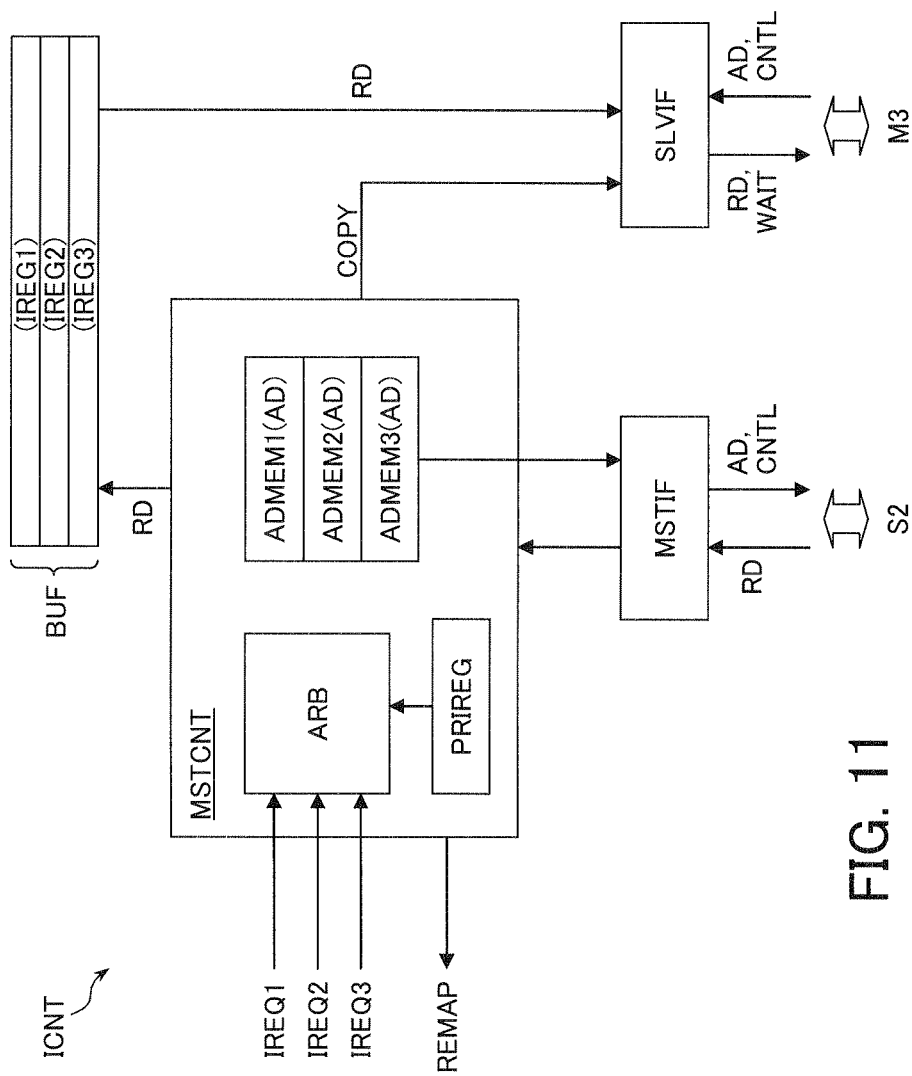
FIG. 11 illustrates an example of the interrupt control circuit illustrated in FIG. 10.

FIG. 11 illustrates an example of the interrupt control circuit ICNT illustrated in FIG. 10. In the master control circuit MSTCNT, the interrupt control circuit ICNT differs from that of FIG. 3. The other configuration of the interrupt control circuit ICNT is the same as that of FIG. 3.

In the master control circuit MSTCNT in this example, a priority decision circuit ARB and a priority set register PRIREG are added to the master control circuit MSTCNT of FIG. 3. Moreover, the master control circuit MSTCNT includes address memory units ADMEM1-3 corresponding to the interrupt requests IREQ1-3, respectively.

The priority decision circuit ARB, when the interrupt request IREQ (either of IREQ1-3) is generated, transmits the generated interrupt request IREQ into the master control circuit MSTCNT. The master control circuit MSTCNT performs the read-access on the corresponding information register IREG (either of IREG1-3) by using the address AD stored in the address memory unit ADMEM (either of ADMEM1-3) corresponding to the generated interrupt request IREQ. In this case, the read-access is performed via the master interface MSTIF, slave port S2, master port M0, bus bridge BBRG, and low-speed bus interface LSBUS. The data RD read from either of the low-speed slaves LSLV1-3 is written into the buffer BUF via the low-speed bus interface LSBUS, bus bridge BBRG, master port M0, slave port S2, and master interface MSTIF. The buffer BUF includes storage areas corresponding to the information registers IREG1-3.

The priority decision circuit ARB, when two or more of interrupt requests IREQ1-3 compete with each other, determines a priority order of the interrupt processing according to the value held in the priority set register PRIREG. For example, in the priority set register PRIREG, the same information as the priority order of the interrupt processing in the CPU is stored. In this example, for the CPU and priority set register PRIREG, the priority order of IREQ2>IREQ1>IREQ3 is set. The priority set register PRIREG may be rewritten by the CPU.

The master control circuit MSTCNT, when two or more of the interrupt requests IREQ1-3 compete with each other, sequentially performs read-access on the information registers IREG1-3 according to the priority order determined by the priority decision circuit ARB, and sequentially writes the read data RD into the buffer BUF.

Moreover, after the interrupt request IREQ (IREQ1-3) is asserted, the master control circuit MSTCNT asserts the remap signal REMAP every time the read access request to the corresponding information register IREG1-3 is issued. The master control circuit MSTCNT negates the remap signal REMAP in response to the fact that the CPU has read the corresponding information from the buffer BUF. That is, the assertion period of the remap signal REMAP is set to the minimum. Thus, as with the above-described embodiments, the CPU may read the interrupt factor held in the information registers IREG1-3 from the buffer BUF capable of being accessed at a high speed.

As described above, also in this embodiment, the same effect as that of the above-described embodiments may be obtained. Furthermore, the priority decision circuit ARB is formed in the interrupt control circuit ICNT, so that the values of the information registers IREG1-3 may be reliably written into the buffer BUF also when a plurality of interrupt requests IREQ1-3 competes with each other.

Figure 12:
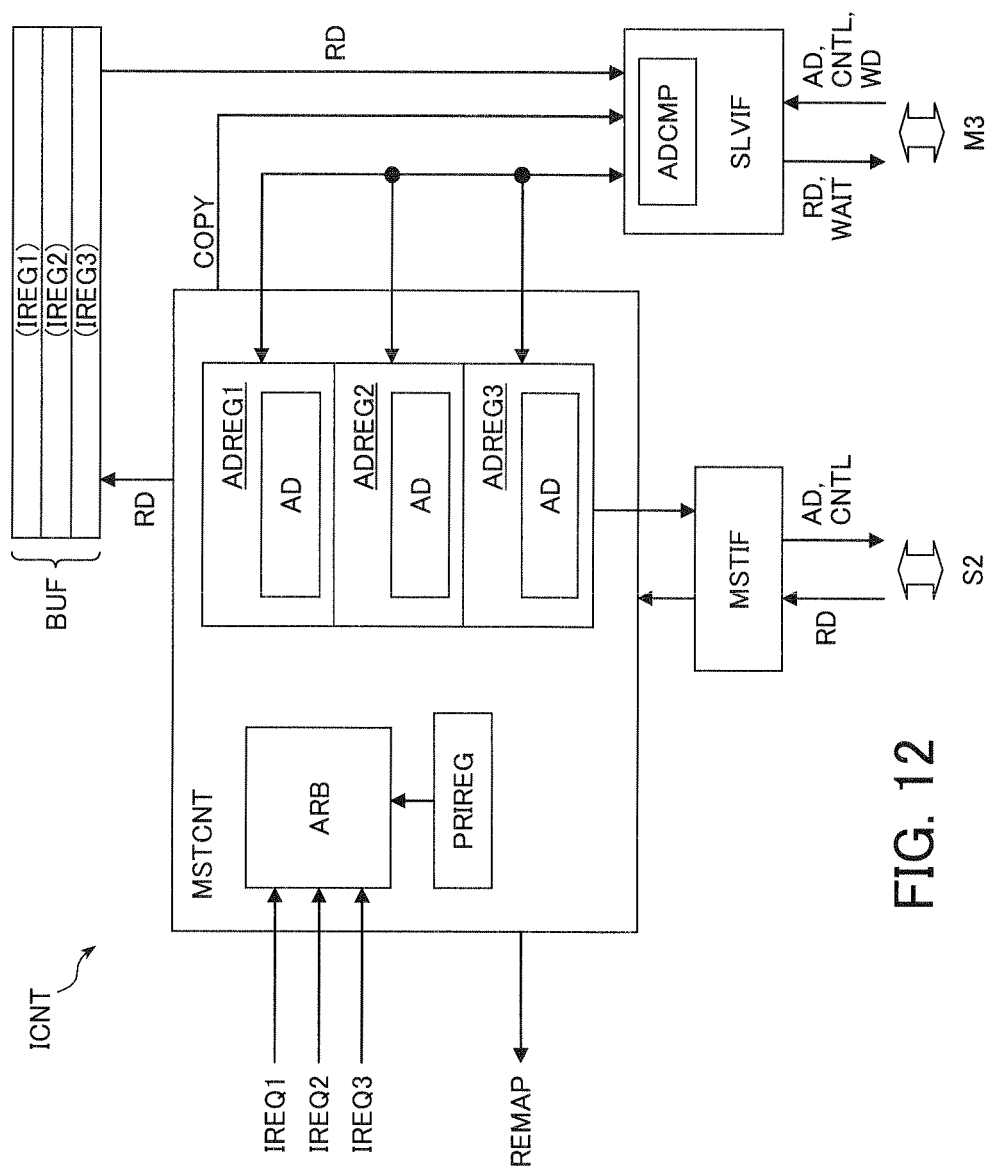
FIG. 12 illustrates an example of the interrupt control circuit in another embodiment.

FIG. 12 illustrates an example of the interrupt control circuit ICNT in another embodiment. For the same elements as the elements in the embodiments described above, the same reference numerals are given, and the detailed description thereof is omitted. For example, the information processing system IPS is formed in one chip as a semiconductor integrated circuit. The configuration of the information processing system IPS except the interrupt control circuit ICNT is the same as that of FIG. 10.

The interrupt control circuit ICNT includes address registers ADREG1-3 corresponding to the interrupt requests IREQ1-3, in place of the address memory units ADMEM1-3.

The function of each of the address registers ADREG1-3 is the same as that of the address register ADREG illustrated in FIG. 8. The other configuration of the interrupt control circuit ICNT is the same as that of FIG. 11. As described above, also in this embodiment, the same effect as that of the above-described embodiments may be obtained.

Figure 13:
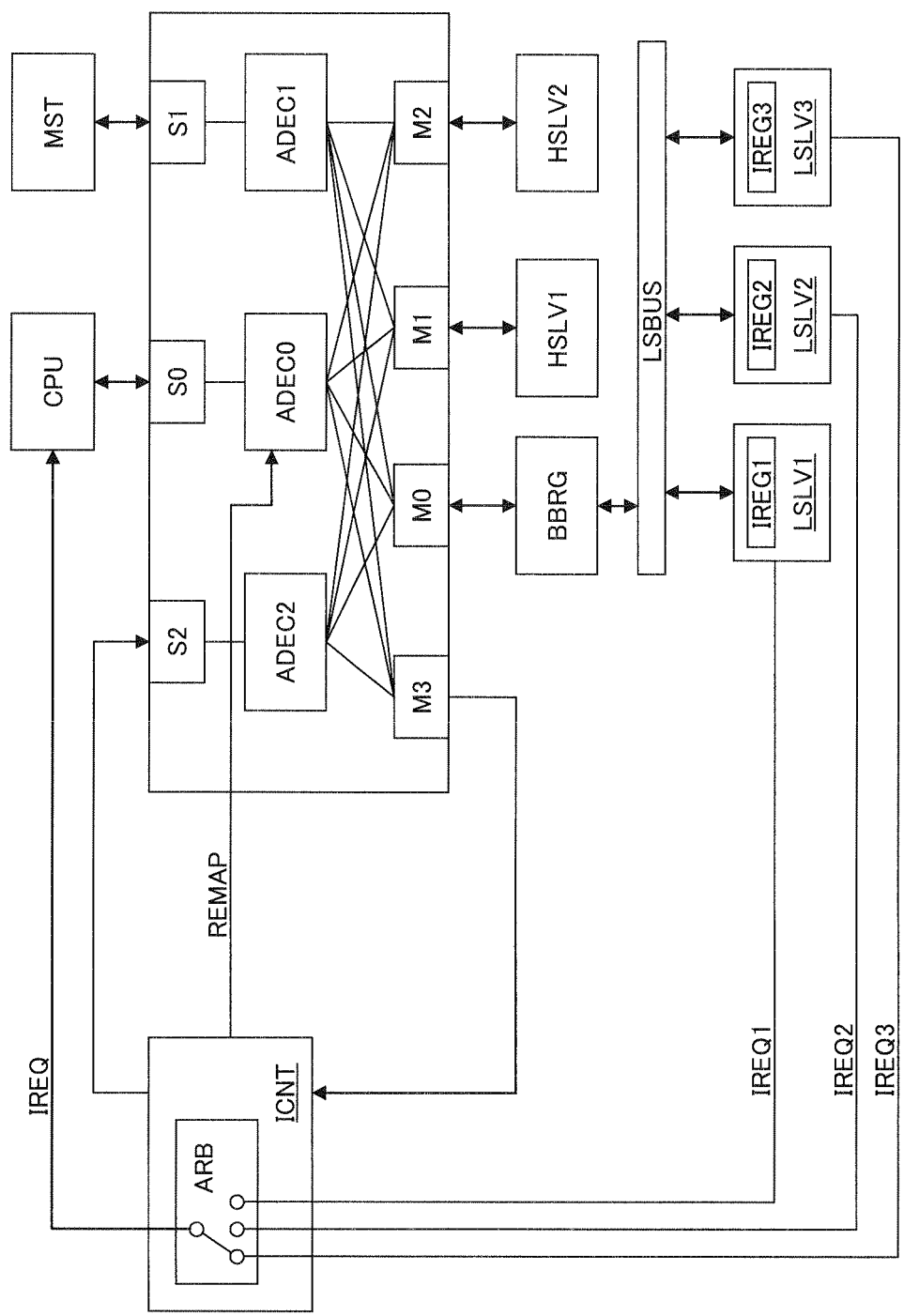
FIG. 13 illustrates an example of the information processing system in another embodiment.

FIG. 13 illustrates an example of the information processing system IPS in another embodiment. For the same elements as the elements in the embodiments described above, the same reference numerals are given, and the detailed description thereof is omitted. In this embodiment, the CPU does not have the function of the interrupt controller. The function of the interrupt controller included in the CPU illustrated in FIG. 2 is incorporated into the interrupt control circuit ICNT.

Although not limited in particular, the interrupt control circuit ICNT is the same as either one of FIG. 11 or FIG. 12. Then, either of the interrupt requests IREQ1-3, to which a priority is given by the priority decision circuit ARB of the interrupt control circuit ICNT, is supplied to the CPU as the interrupt request IREQ. That is, in this embodiment, the priority decision circuit ARB serves also as the priority decision circuit of the interrupt requests IREQ1-3 formed in the CPU. For this reason, the CPU does not include the priority decision circuit.

Note that when the information processing system IPS includes the interrupt controller coupled to the CPU, the interrupt controller may have the function of the interrupt control circuit ICNT of FIG. 11 or FIG. 12. As described above, also in this embodiment, the same effect as that of the above-described embodiments may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
   a processor coupled to a first bus interface and executing a program;
   at least one of slaves being accessed via a second bus interface, including an information register in which information indicative of an interrupt factor is stored, and issuing an interrupt request to the processor;
   an interrupt control circuit including a buffer exclusively for interrupt processing coupled to the first bus interface, asserting a remap signal in response to the interrupt request to the processor, reading the information stored in the information register, and writing the information being read into the buffer; and
   a switch circuit supplying a read access request to one of the slaves during negation of the remap signal, and supplying the read access request to the buffer via the interrupt control circuit in order to read the information from the buffer during assertion of the remap signal, the read access request being a request from the processor to the information register.

2. The information processing system according to claim 1, wherein the interrupt control circuit includes an address register rewritably holding a first address indicative of the information register, and reads the information from the information register using the first address held in the address register in response to the interrupt request.

3. The information processing system according to claim 2, wherein the interrupt control circuit includes an address comparator which determines whether or not a second address included in the read access request coincides with the first address held in the address register, reads the information from the buffer when the first and the second addresses coincide with each other, and supplies the read access request to one of the slaves, reads data from the one of the slaves, and outputs read data to the processor when the first and the second addresses do not coincide with each other.

4. The information processing system according to claim 1, further comprising a plurality of the slaves, wherein the interrupt control circuit includes a priority decision circuit which determines a priority order when the interrupt request from each of the plurality of slaves competes with each other, sequentially reads the information from the information register of the each of slaves which issues a corresponding interrupt request according to the priority order being determined, and writes the information being read into the buffer.

5. The information processing system according to claim 4, wherein the interrupt control circuit includes address registers each rewritably holding address indicative of the information register of each of the slaves.

6. The information processing system according to claim 1, wherein the interrupt control circuit issues a wait request to the processor when the read access request is issued before writing the information stored in the information register into the buffer in response to the interrupt request.

7. The information processing system according to claim 1, wherein the interrupt control circuit comprises:

a master interface coupled to the second bus interface and used in reading the information stored in the information register of one of the slaves; and a slave interface coupled to the first bus interface and used in accessing the buffer in response to the read access request.

* * * * *